US012065796B2

(12) United States Patent
Rong

(10) Patent No.: US 12,065,796 B2
(45) Date of Patent: Aug. 20, 2024

(54) PORTABLE GROUND PICKING COLLECTOR

(71) Applicant: Kebin Rong, Alhambra, CA (US)

(72) Inventor: Kebin Rong, Alhambra, CA (US)

( * ) Notice: Subject to any disclaimer, the term of this patent is extended or adjusted under 35 U.S.C. 154(b) by 521 days.

(21) Appl. No.: 17/461,888

(22) Filed: Aug. 30, 2021

(65) Prior Publication Data

US 2023/0067996 A1 Mar. 2, 2023

(51) Int. Cl.
*E01H 1/12* (2006.01)
*B65F 1/00* (2006.01)

(52) U.S. Cl.
CPC ............. *E01H 1/12* (2013.01); *B65F 1/0006* (2013.01); *E01H 1/1206* (2013.01); *B65F 2240/136* (2013.01); *E01H 2001/1226* (2013.01)

(58) Field of Classification Search
CPC ............ E01H 1/1206; E01H 2001/122; E01H 2001/1226; E01H 2001/126
USPC .......................................................... 294/213
See application file for complete search history.

(56) References Cited

U.S. PATENT DOCUMENTS 4,466,647 A * 8/1984 Spevak ................ A01K 23/005 294/100
5,564,763 A * 10/1996 Mercurio .............. E01H 1/1206 294/1.3
6,086,123 A * 7/2000 Sowinski .............. E01H 1/1206 294/1.3
10,100,475 B1 * 10/2018 Luna ...................... E01H 1/1206
10,667,492 B1 * 6/2020 Rong ................... A01K 23/005

FOREIGN PATENT DOCUMENTS

FR 2505898 A * 11/1982 ........... E01H 1/1206
JP 2000060347 A * 2/2000 ........... E01H 1/1206
KR 20090027881 A * 3/2009

* cited by examiner

*Primary Examiner* — Dean J Kramer
(74) *Attorney, Agent, or Firm* — David & Raymond Patent Firm; Raymond Y Chan

(57) ABSTRACT

A portable ground picking collector includes a picking tool having two picking portions and a control arrangement equipped with a disposable bag. The disposable bag is constructed by two bag layers to define a storage cavity and an opening. The control arrangement is configured to detachably hold at the picking portions of the picking tool at the bag layers respectively. When the picking tool is actuated to move the picking portions thereof away from each other, the opening of the disposable bag is opened up for receiving ground waste in the storage cavity. When the picking tool is actuated to move the picking portions thereof toward each other for picking up the ground waste, the opening of the disposable bag is closed to retain the ground waste in the storage cavity, such that the disposable bag is detached from the picking tool for disposing the ground waste in the disposable bag.

4 Claims, 10 Drawing Sheets

PORTABLE GROUND PICKING COLLECTOR

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a sanitation apparatus, and more particularly to a portable ground picking collector, wherein the picking portions of the picking tool are configured to be wrapped by a disposable bag to pick up and collect ground waste into the disposable bag.

Description of Related Arts

In order to maintain a clean environment, many people are obligated to pick up ground wastes during a walk or hiking. Pet owners are obligated by law to clean up the pet wastes, especially while walking their pets. Accordingly, people usually carry a scooper for scooping the ground waste and place it into a disposable bag. However, during the scooping operation, the scooper must contact the ground or pet waste, such that the scooper will be contaminated by the ground or pet waste and the scooper must be cleaned after every scooping operation. Furthermore, the scooping operation requires two-hand operation that one hand of the user holds the scooper and another hand carries the disposable bag.

In addition, there are so many occasions, such as a waiter of a restaurant, a nurse of a hospital, or other person in an environment having sanitation requirement, that one needs to pick up an article on a surface such as ground surface without hand contact directly. For example, a waiter or a chef of a restaurant is preferred not to use his or her hand, even wearing a glove, to pick up anything on ground for sanitation requirement.

There are several products on the market for picking up ground wastes. However, such picking products are either configured to have a complicated or bulky structure or fail to achieve one hand operation. In other words, the operation of the picking product is not user friendly and the size of the picking product is relatively large or bulky that is not convenient for portable purpose, such that most people will not carry these products while walking their pets. More importantly, these products are not environmental friendly that the disposable bag cannot be reused. In other words, the disposable bag must be replaced after every operation of the product.

SUMMARY OF THE PRESENT INVENTION

The invention is advantageous in that it provides a portable ground picking collector, wherein the picking portions of the picking tool are configured to be wrapped by a disposable bag to pick up and collect ground waste into the disposable bag so as to prevent any contamination of the picking tool during the picking operation.

Another advantage of the invention is to provide a portable ground picking collector, wherein an opening portion of the disposable bag is able to be controlled by the picking tool, such that when the picking tool is actuated to move the picking portions thereof away from each other, the opening portion of said disposable bag retained by the picking portions is opened up by the picking portions at the same time to open the opening of the disposable bag for receiving the ground waste in the disposable bag, and when the picking tool is actuated to move the picking portions thereof toward each other for picking up the ground waste, the opening of said disposable bag is closed to contain the ground waste in the disposable bag.

Another advantage of the invention is to provide a portable ground picking collector, wherein after collecting the ground waste in the disposable bag, the disposable bag can be detached from the picking tool for disposing the ground waste contained in the disposable bag.

Another advantage of the invention is to provide a portable ground picking collector, wherein by utilizing the portable ground picking collector with a disposable bag, the disposable bag can be reused to keep collecting ground wastes until the disposable bag is full before the disposable bag is detached from the picking tool.

Another advantage of the invention is to provide a portable ground picking collector, which is configured to be foldable to minimize to a portable size for ease to carry and use. In particular, the picking portions of the picking tool are able to be folded to be protected by the operation handle when the picking collector is not in use.

Another advantage of the invention is to provide a portable ground picking collector, which the picking portions of the picking tool are configured to enable the opening portion of the disposable bag being retained therewith in such a manner that the operation of the picking portions away from each other or toward each other will respectively control the opening and closing of the opening of the disposable bag simultaneously.

Another advantage of the invention is to provide a portable ground picking collector, which does not involve complicated and expensive mechanical components and processes so that the manufacturing cost of the present invention can be minimized.

Another advantage of the invention is to provide a portable ground picking collector, wherein the method is simple and efficient. In other words, the present invention provides an optimal method for picking and collecting the ground waste in a sanitary manner.

Another advantage of the invention is to provide a portable ground picking collector, wherein no expensive or complicated structure is required to employ the present invention in order to achieve the above mentioned objectives. Therefore, the present invention successfully provides an economic and efficient solution to provide a waste collector for easily picking and collecting the ground waste and for preventing any contamination through the operation.

Additional advantages and features of the invention will become apparent from the description which follows, and may be realized by means of the instrumentalities and combinations particular point out in the appended claims.

According to the present invention, the foregoing and other objects and advantages are attained by a portable ground picking collector for operating a disposable bag having a storage cavity and an opening to pick and collect one or more ground waste therein, comprising:

a picking tool having two picking portions; and a control arrangement comprising an operator provided between the picking tool for operating the two picking portions to be away from each other or towards each other, and a pair of retainers arranged at the two picking portions respectively such that the opening of the disposable bag is able to be detachably held at the picking portions of the picking tool for controlling an opening and closing of the opening of the disposable bag while operating the operator wherein when the picking tool is actuated to move the picking portions thereof away from each other, the opening of the disposable bag is opened up for receiving the ground waste into the storage cavity, and that when the picking tool is actuated to move the picking portions thereof toward each other for picking up the ground waste, the opening of the disposable bag is closed to retain the ground waste in the storage cavity, thereby the disposable bag is able to be detached from the picking tool for disposing the disposable bag with the ground waste retained therein.

The disposable bag adapted to be use with the portable ground picking collector of the present invention comprises a bag body made by two bag layers overlapped with each other to define the storage cavity between the bag layers and an opening portion defining the opening communicating with the storage cavity.

In accordance with another aspect of the invention, the present invention comprises a method of picking ground waste by a portable ground picking collector which comprises a picking tool and a disposable bag, comprising the following steps.

(1) Configure two picking portions of the picking tool to respectively couple at opening portions of the disposable bag at positions that the picking portions of the picking tool are able to be wrapped by the disposable bag, wherein the disposable bag comprises two bag layers overlapped with each other to define a storage cavity between the bag layers.

(2) Actuate the picking tool to move the picking portions thereof away from each other to open up the opening of the disposable bag.

(3) Actuate the picking tool to pick up the ground waste by the picking portions of the picking tool for guiding the ground waste into the storage cavity of the disposable bag.

(4) Configure the picking portions of the picking tool to detach from the disposable bag for disposing the disposable bag with the ground waste contained inside.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
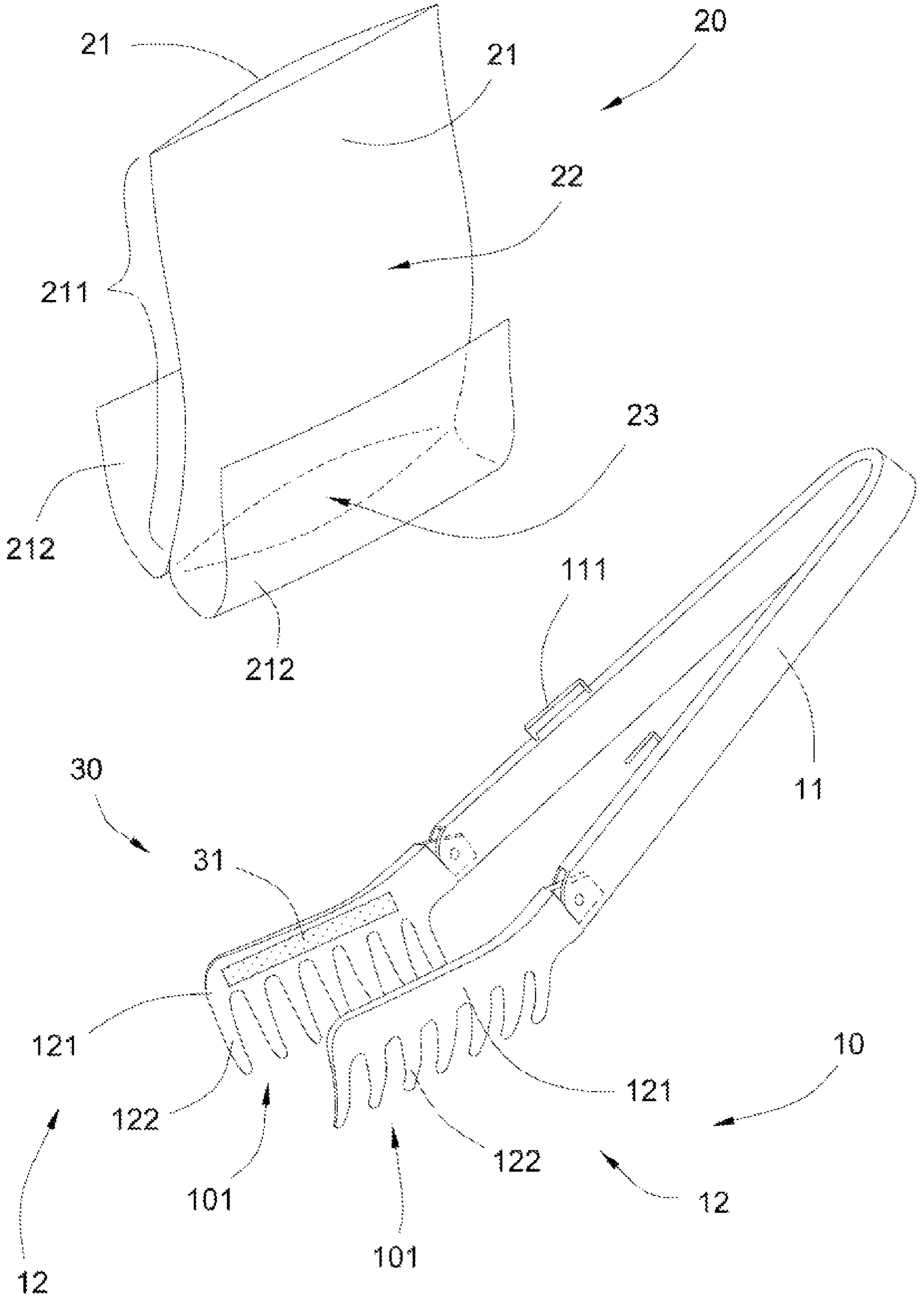
FIG. 1 is a perspective view of a portable ground picking collector and a disposable bag to be equipped therewith according to a preferred embodiment of the present invention.
Figure 2:
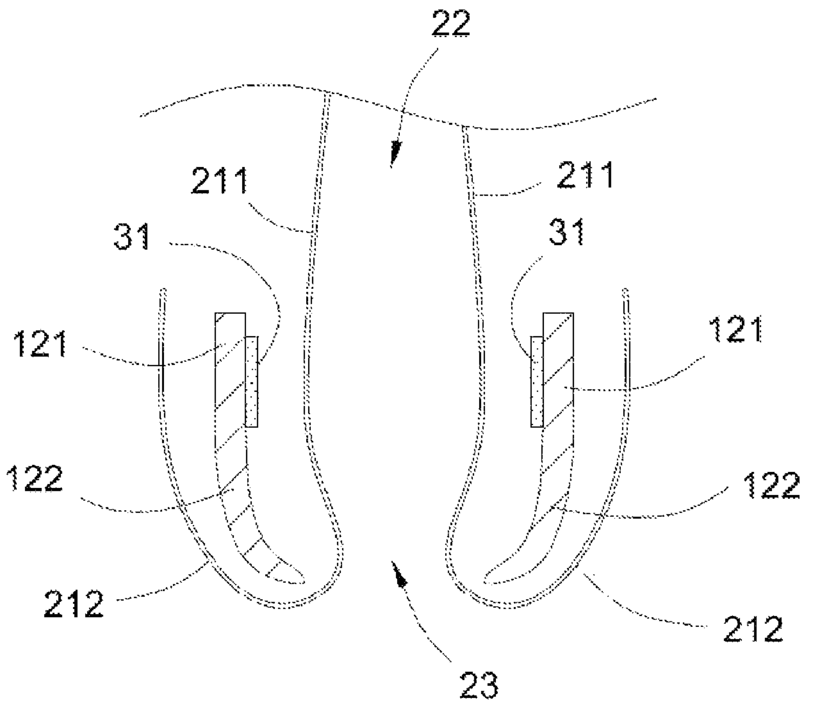
FIG. 2 is a partially sectional view of the portable ground picking collector and the disposable bag according to the above preferred embodiment of the present invention.

Referring to FIGS. 1 and 2 of the drawings, a portable ground picking collector according to a preferred embodiment of the present invention is illustrated, wherein the portable ground picking collector is arranged for picking and collecting ground waste in a sanitary manner. The portable ground picking collector according to the preferred embodiment comprises a picking tool 10 having two picking portions 101 and a control arrangement 30, configured to be operated with a disposable bag 20.

The disposable bag 20 can be a conventional plastic bag comprising two bag layers 21 overlapped with each other to define a storage cavity 22 between the bag layers 21 and an opening portion 212 forming an opening 23 communicating with the storage cavity 22.

The control arrangement 30 is arranged to be provided between the picking tool 10 and the opening portion 212 of the disposable bag 20 to detachably hold at the picking portions 101 of the picking tool 10 at the bag layers 21 respectively. The opening 23 of the disposable bag 20 is controlled to be opened and closed by the picking tool 10 via the control arrangement 30. Particularly, when the picking tool 10 is actuated to move the picking portions 101 thereof away from each other, the opening 23 of the disposable bag 20 is opened up for receiving the ground waste in the storage cavity 22 of the disposable bag 20. When the picking tool 10 is actuated to move the picking portions 101 thereof toward each other for picking up the ground waste, the opening 23 of the disposable bag 20 is closed to retain the ground waste in the storage cavity 22 of the disposable bag 20. Then, the user can detach the disposable bag 20 from the picking tool 10 for disposing the disposable bag 20 with the ground waste received therein.

As shown in FIG. 1, the two picking portions 101 of the picking tool 10 are configured for picking the ground waste. Accordingly, the picking tool 10 comprises a hand-held handle 11 and two picking claws 12 extended from two ends of the hand-held handle 11 to define the picking portions 101 at the picking claws 12. In one embodiment, the hand-held handle 11 comprises a U-shaped resilient frame coupling to the picking claws 12, such that the resilient frame is squeezed to move the picking claws 12 toward each other for picking up the ground waste and for closing the opening 23 of the disposable bag 20 at the same time. In other words, the picking tool 10 is embodied as a tong like picking tool. When the squeezing force is released from the hand-held handle 11, the resilient frame is bound to return back to its original form, such that the picking claws 12 is moved away from each other for opening up the opening 23 of the disposable bag 20. In other words, when a distance between the picking portions 101 of the picking tool 10 is minimized, the opening 23 of the disposable bag 20 is closed. Likewise, when distance between the picking portions 101 of the picking tool 10 is maximized, the opening 23 of the disposable bag 20 is opened. It should be appreciated that the hand-held handle 11 can incorporate with a resilient element, such as a coil spring, to control the distance between the picking claws 12.

Accordingly, the picking claws 12 are preferred to be inclinedly extended from two ends of the hand-held handle 11 at a predetermined angle, wherein the user is able to align the picking claws 12 on the ground surface when holding the hand-held handle 11 at an angle for easily actuating the picking claws 12 and for conveniently picking up the ground waste.

In one embodiment, each of the picking claws 12 comprises an elongated extension frame 121 coupled at the hand-held handle 11, and a plurality of claw members 122 spacedly extended along an edge of the extension frame 121. Preferably, the claw members 122 are curved claws, wherein the claw members 122 at one extension frame 121 are curved toward the claw members 122 at another extension frame 121. Preferably, the extension frame 121 is foldably extended from one end of the hand-held handle 11. Particularly, the extension frame 121 is pivotally coupled at the end of the hand-held handle 11, such that the extension frame 121 is folded to the hand-held handle 11 to reduce the overall size of the picking tool 10 in a compact structure when it is not in use. Preferably, the picking claws 12 are downwardly and pivotally folded from the ends of the hand-held handle 11. Two locking members 111 are provided at the hand-held handle 11 to releasably lock up the picking claws 12 respectively when the picking claws 12 are pivotally folded at the hand-held handle 11 and when the hand-held handle 11 is squeezed toward each other.

As shown in FIGS. 1 and 2, the disposable bag 20 is preferred to be made of bio-degradable material. The disposable bag 20 may have a tubular body forming the two bag layers 21 with one end sealed and another end forming the opening 23 or may be constructed by overlapping the two bag layers 21 and sealing edges of the bag layers 21, wherein an edge of each bag layer 21 is unsealed to form the opening 23 and the portion surrounding and defining the opening 23 forms the opening portion 212. Alternatively, the disposable bag 20 can also be constructed by overlapping and folding a layer in half to form the two bag layers 21, such that one edge of the bag layer 21 is integrated with one edge of another bag layer 21.

According to the preferred embodiment, each of the bag layers 21 of the disposable bag 20 has a bag portion 211 and the opening portion 212. When the bag layers 21 are overlapped with each other, the storage cavity 22 of the disposable bag 20 is formed between the bag portions 211 of the bag layers 21 while the opening 23 is defined at the opening portions 212 of the bag layers 21. A length of the bag portion 211 is longer than a length of the opening portion 212. In one embodiment, the opening portions 212 of the bag layers 21 are outwardly folded toward the bag portions 211 of the bag layers 21 respectively. The picking portion 101 of the picking tool 10 is wrapped between the opening portion 212 and the bag portion 211 of the bag layer 21 to keep the picking portion 101 clean, as shown in FIG. 2.

As shown in FIGS. 1 and 2, the control arrangement 30 comprises two reusable adhesive members 31, embodied as adhesive film, provided at two inner sides of the picking portions 101 of the picking tool 10 to detachably adhere on two outer sides of the bag layers 21 respectively. In one embodiment, the reusable adhesive films 31 are provided at two inner sides of the extension frames 121 to detachably adhere on two outer sides of the bag portions 211 of the bag layers 21 respectively. Preferably, in one embodiment, the reusable adhesive members 31 are detachably adhered on the bag portions 211 of the bag layers 21 right below the opening portions 212 thereof, such that after the picking portions 101 of the picking tool 10 are detachably adhered on the bag portions 211 of the bag layers 21 respectively, the picking portions 101 of the picking tool 10 are wrapped and retained between the opening portions 212 and the bag portions 211 of the bag layers 21. It is worth mentioning that the reusable adhesive members 31 are reusable that after the reusable adhesive member 31 is detached from the bag layer 21, the reusable adhesive member 31 can re-adhere on the bag layer 21 or the bag layer 21 of another disposable bag 20. Therefore, the user is able to adjust the adhering position of the disposable bag 20 and to re-use the picking tool 10 for other disposable bags 20.

Figure 2A:
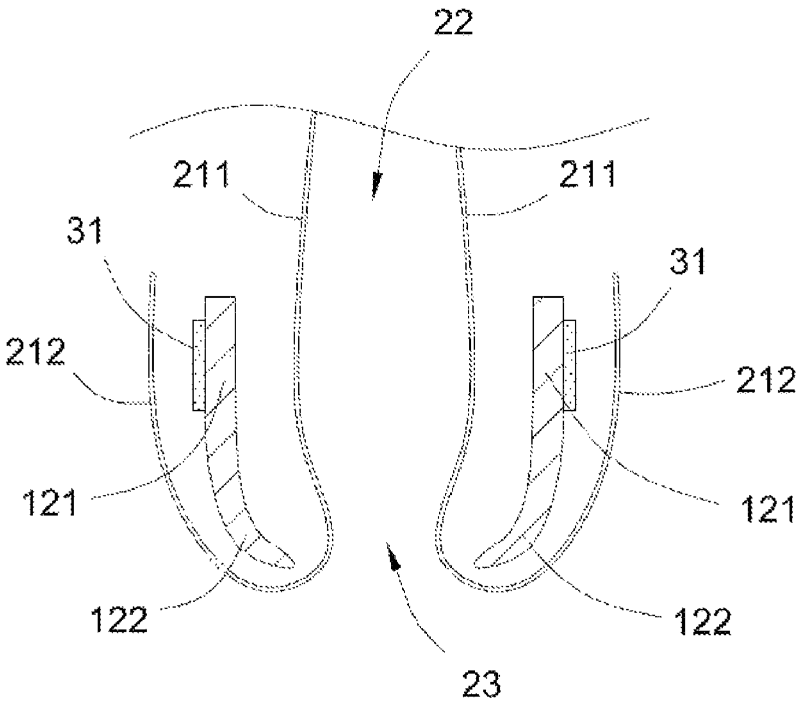
FIG. 2A illustrates an alternative mode of the adhesive members of the portable ground picking collector according to the above preferred embodiment of the present invention.

It should be appreciated that location of the adhesive member 31 can be altered, as shown in FIG. 2A, wherein the two reusable adhesive members 31 are affixed on two outer sides of the picking portions 101 of the picking tool 10 to detachably adhere on two outer sides of the bag layers 21 respectively. Particularly, the two reusable adhesive films 31 are provided at two outer sides of the extension frames 121 to detachably adhere on two inner sides of the opening portions 212 of the bag layers 21 respectively when the opening portions 212 are folded at the bag portions 211 thereof. In other words, when the opening portion 212 of the bag layer 21 is outwardly folded at the bag portion 211 thereof, the opening portion 212 of the bag layer 21 is adhered at the picking portion 101 of the picking tool 10 via the adhesive member 31.

In order to couple the picking tool 10 at the disposable bag 20, one of the picking portions 101 of the picking tool 10 can be firstly adhered on one of the bag layers 21 via the corresponding reusable adhesive member 31, then another picking portion 101 of the picking tool 10 can be adhered on another bag layer 21 via the corresponding reusable adhesive member 31. Once the picking portions 101 of the picking tool 10 are correctly adhered on the bag layers 21 via the reusable adhesive films 31, the opening portions 212 of the bag layers 21 are outwardly folded to wrap and retain the picking portions 101 of the picking tool 10 between the opening portions 212 and the bag portions 211 of the bag layers 21.

Figure 3:
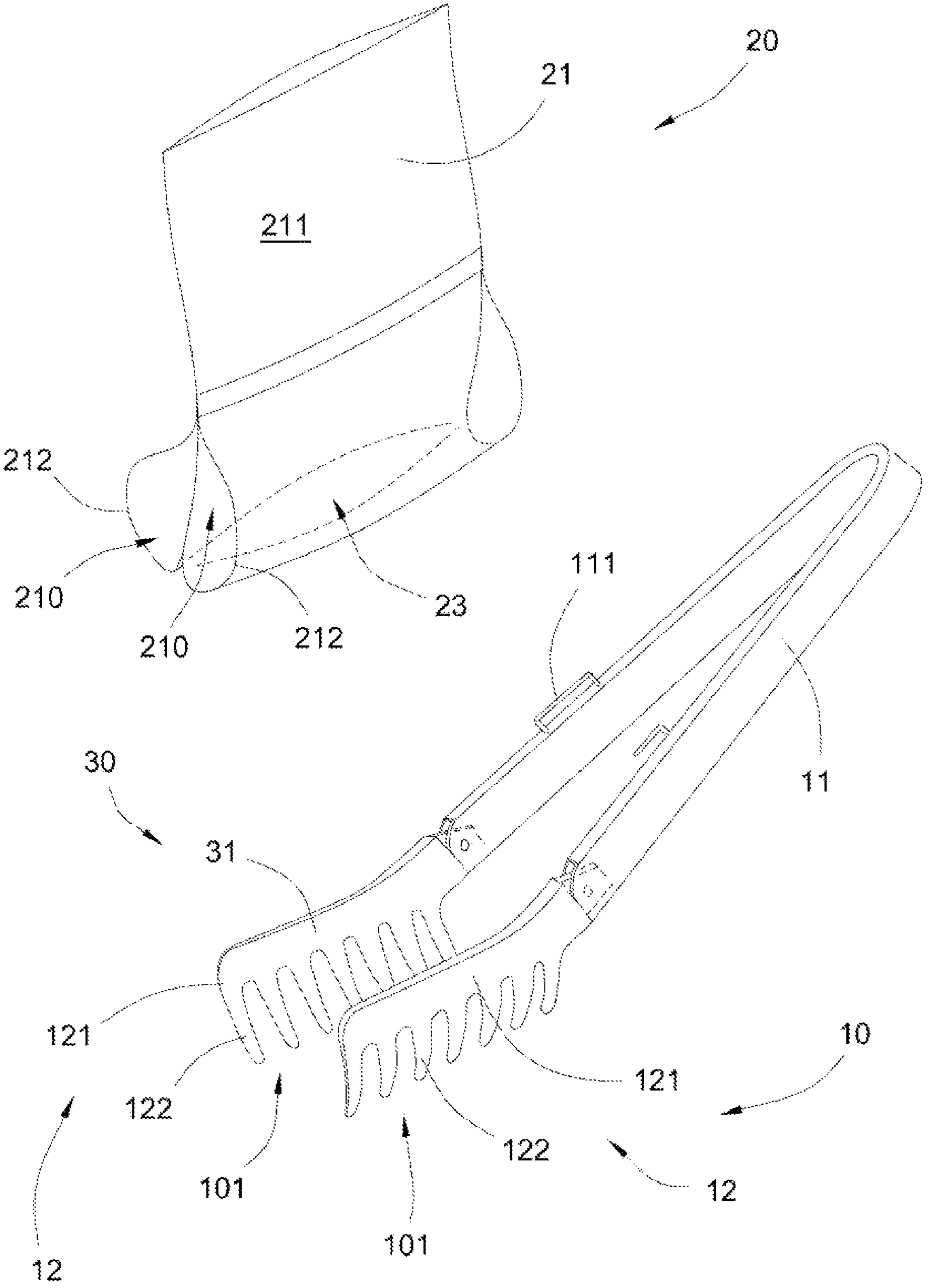
FIG. 3 is a first alternative mode of the portable ground picking collector equipped with a first alternative disposable bag according to the above preferred embodiment of the present invention.
Figure 4:
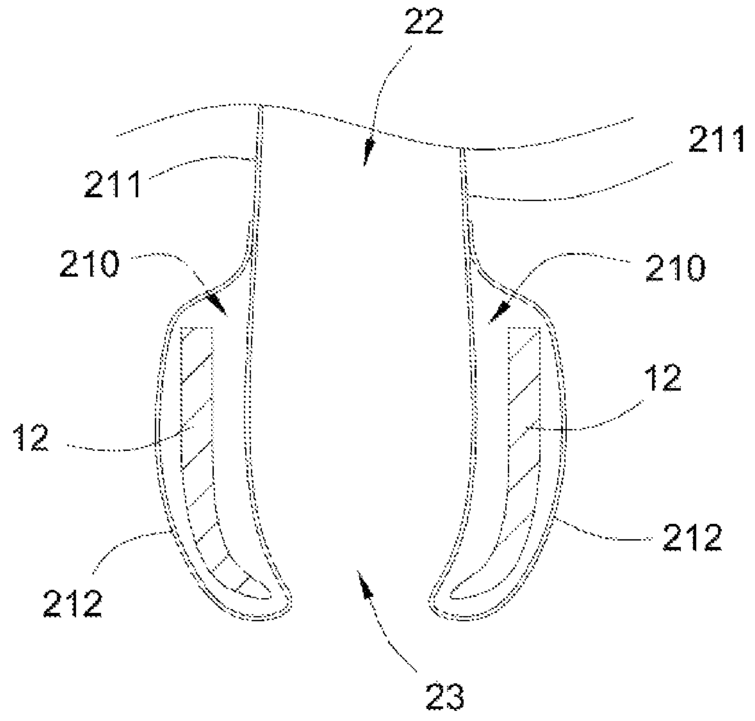
FIG. 4 is a partially sectional view of the portable ground picking collector according to the above preferred embodiment of the present invention, illustrating the picking portions of the picking tool coupling at the first alternative disposable bag.

FIG. 3 illustrates an alternative mode of the control arrangement 30 incorporating with the disposable bag 20 as a modification of the disposable bag 20. Accordingly, the opening portions 212 of the bag layers 21 are outwardly folded toward the bag portions 211 of the bag layers 21 respectively. Particularly, the opening portions 212 of the bag layers 21 are outwardly folded to detachably and overlappedly attach to the bag portions 211 of the bag layers 21 respectively. The opening portion 212 of each of the bag layers 21 is detachably and overlappedly attached to the bag portion 211 thereof to form a holding channel 210 therebetween. In other words, a free edge of the opening portion 212 is detachably sealed at the bag portion 211 of the bag layer 21 to form the holding channel 210. Therefore, the holding channels 210 integrally form with the control arrangement 30 for the picking portions 101 of the picking tool 10 sliding into the holding channels 210 respectively, so as to hold the picking portions 101 of the picking tool 10 at the opening 23 of the disposable bag 20, as shown in FIG. 4. It is worth mentioning that the holding channel 210 can be pre-formed, wherein the picking portion 101 of the picking tool 10 is slid at the holding channel 210. Likewise, the holding channel 210 can be formed after the opening portion 212 of the bag layer 21 is outwardly folded and attached to the bag portion 211 of the bag layer 21 to sandwich the picking portion 101 of the picking tool 10 between the bag portion 211 and the opening portion 212 of the bag layer 21. In other words, the bag portions 211 of the bag layers 21 can be sandwiched and held by the picking portions 101 of the picking tool 10, such that the opening portions 212 of the bag layers 21 are outwardly folded and attached to the bag portions 211 of the bag layers 21 to form the holding channels 210 for receiving the picking portion 101 of the picking tool 10 thereat.

In order to couple the picking tool 10 at the disposable bag 20, the picking portions 101 of the picking tool 10 can be slidably inserted into the holding channels 210 respectively, Once the picking portions 101 of the picking tool 10 are slid in the holding channels 210, the picking portions 101 of the picking tool 10 are correctly retained at the opening 23 of the disposable bag 20. It is worth mentioning that the opening portion 212 of the bag layer 21 can be detached or unsealed to the bag portion 211 thereof to detach the picking tool 10 from the disposable bag 20.

Figure 5:
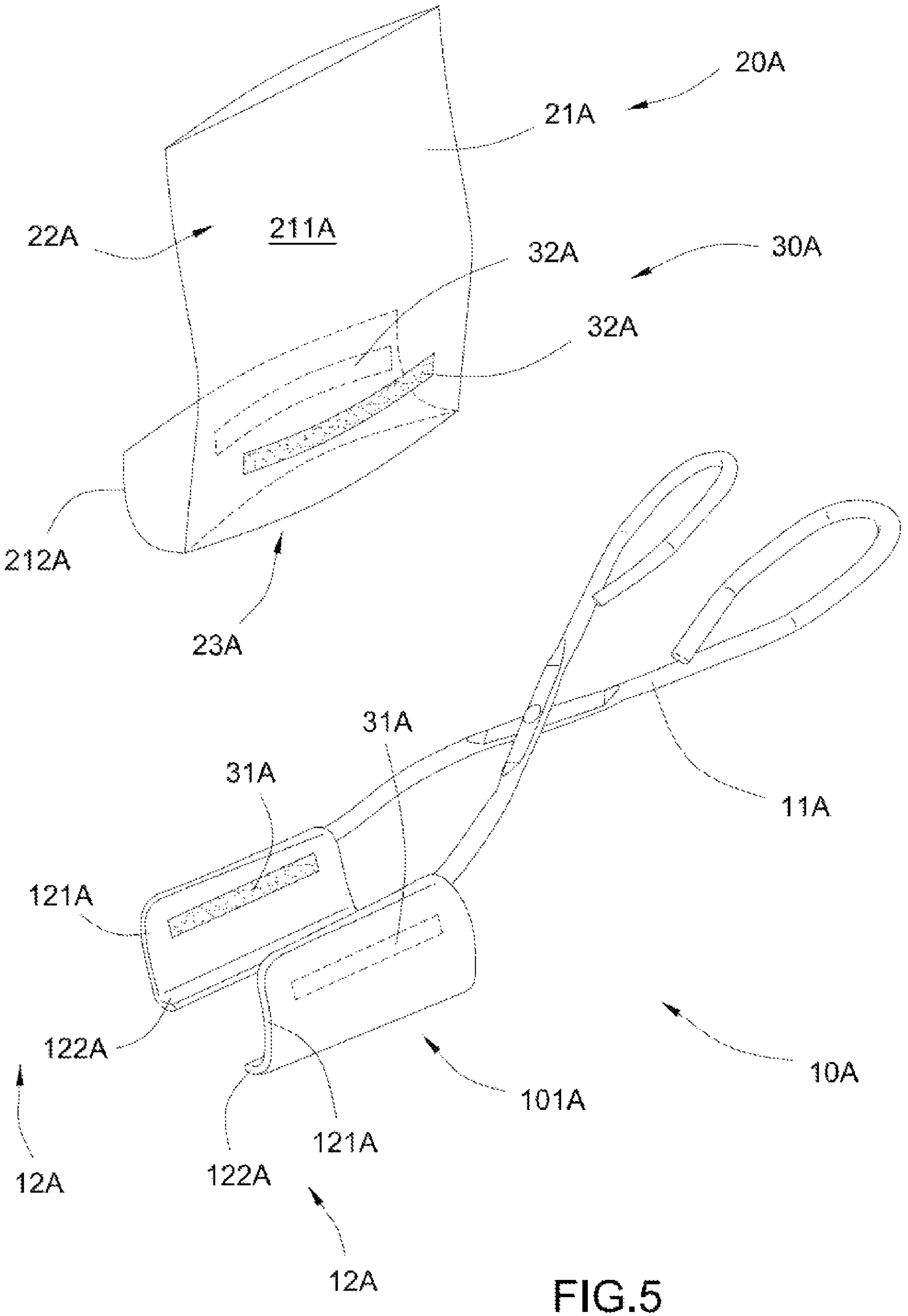
FIG. 5 is perspective view of a second alternative mode of the portable ground picking collector and a second alternative disposable bag according to the above preferred embodiment of the present invention.
Figure 6:
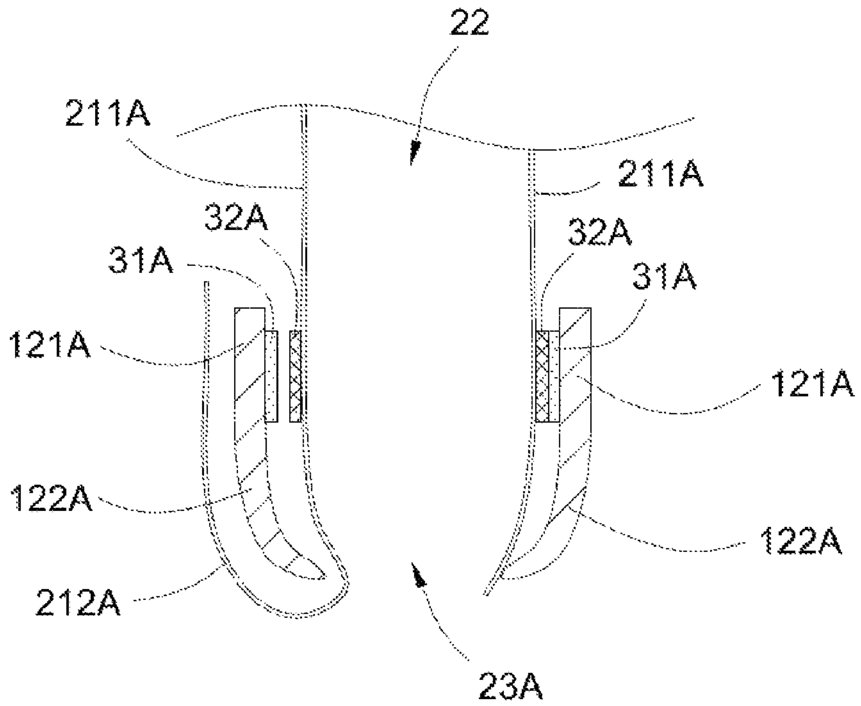
FIG. 6 is a partially sectional view of the portable ground picking collector according to the second alternative mode of the above preferred embodiment of the present invention, illustrating the picking portions of the picking tool coupling at the second alternative disposable bag.

FIGS. 5 and 6 illustrate another alternative mode of the picking tool 10A, the disposable bag 20A, and the control arrangement 30A of the portable ground picking collector according to the preferred embodiment of the present invention. The picking tool 10A comprises a hand-held handle 11A and two picking scoops 12A extended from two ends of the hand-held handle 11A to define the picking portions 101A at the picking scoops 12A. In one embodiment, the hand-held handle 11A comprises two handle members pivotally coupled together to form a scissor like structure. In other words, the picking tool 10A is embodied as a scissor like picking tool. Therefore, when two handling ends of the hand-held handle 11A are moved toward each other, the handle members are pivotally moved to move the picking scoops 12A toward each other so as to close the opening 23A of the disposable bag 20A. When the two handling ends of the hand-held handle 11A are moved away from each other, the handle members are pivotally moved to move the picking scoops 12A away from each other so as to open up the opening 23A of the disposable bag 20A.

Accordingly, the picking scoops 12A are inclinedly extended from two ends of the hand-held handle 11A at a predetermined angle, wherein the user is able to align the picking scoops 12A on the ground surface when holding the hand-held handle 11A at an angle for easily actuating the picking scoops 12A and for conveniently picking up the ground waste.

Each of the picking scoops 12A comprises an elongated extension frame 121A coupled at the hand-held handle 11A, and a scooping member 122A extended along an edge of the extension frame 121A. Preferably, the scooping members 122A are curved claws, wherein the scooping member 122A at one extension frame 121A are curved toward the scooping member 122A at another extension frame 121A. Preferably, a thickness of the picking scoop 12A is gradually reduced from the scooping member 122A to the extension frame 121A.

As shown in FIGS. 5 and 6, one of the bag layers 21A is constructed to have a bag portion 211A and an opening portion 212A while another bag layer 21A is constructed to only have the bag portion 211A. When the bag layers 21A are overlapped with each other, the storage cavity 22A of the disposable bag 20A is formed between the bag portions 211A of the bag layers 21A while the opening 23A is defined at the opening portion 212A of the bag layer 21A. Accordingly, the opening portion 212A of the bag layer 21A is outwardly folded toward the bag portion 211A of the bag layer 21A. One of the picking portions 101A of the picking tool 10A is wrapped between the opening portion 212A and the bag portion 211A of the bag layer 21A as a completed wrapped picking portion to keep the picking portion 101A clean, as shown in FIG. 6. Even though another picking portion 101A of the picking tool 10A does not wrapped by the opening portion 212A of the bag layer 21A, the inner side of the picking portion 101A of the picking tool 10A is covered by the bag portion 211A of the bag layer 21A as a partially wrapped picking portion. The user is able to use the completed wrapped picking portion to pick up the ground waste at the opening 23A of the disposable bag 20A and guide the ground waste into the storage cavity 22A of the disposable bag 20A.

The control arrangement 30A comprises two first detachable fasteners 31A provided at two inner sides of the picking portions 101A of the picking tool 10A respectively and two second detachable fasteners 32A provided at two outer sides of the bag layers 21A respectively. Accordingly, when the first and second detachable fasteners 31A, 32A are detachably fastened with each other, the picking portions 101A of the picking tool 10A are held at the bag layers 21A respectively. When the first and second detachable fasteners 31A, 32A are detached from each other, the disposable bag 20A is detached from the picking tool 10A.

As shown in FIGS. 5 and 6, the first detachable fasteners 31A are provided at two inner sides of the extension frames 121A of the picking scoops 12A respectively while the second detachable fasteners 32A are provided at two outer sides of the bag portions 211A of the bag layers 21A respectively. Therefore, the user is able to align the first and second detachable fasteners 31A, 32A with each other in order to correctly couple the picking portions 101A of the picking tool 10A on the bag layers 21A at the opening 23A of the disposable bag 20A via the first and second detachable fasteners 31A, 32A. Preferably, the first and second detachable fasteners 31A, 32A are hook and loop fasteners respectively, wherein the user is able to adjust the fastening position of the disposable bag 20A and to re-use the picking tool 10A for other disposable bags 20A.

Figure 6A:
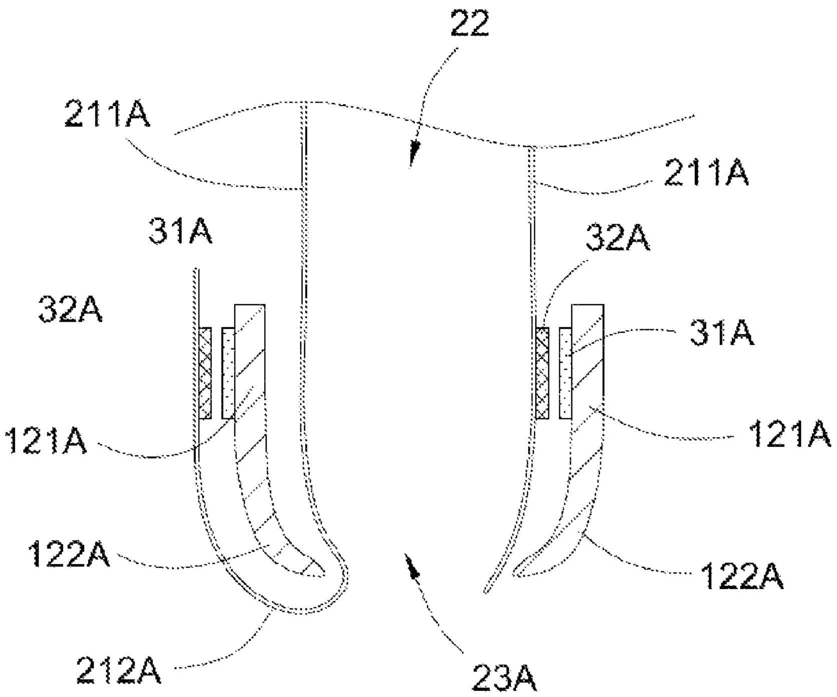
FIG. 6A is a modification of the first and second detachable fasteners of the portable ground picking collector according to the second alternative mode of the above preferred embodiment of the present invention.

It should be appreciated that location of the first and second detachable fasteners 31A, 32A can be altered, as shown in FIG. 6A, wherein at least one of the first detachable fasteners 31A is provided at the outer side of the extension frame 121A while at least one of the second detachable fasteners 32A is provided at the inner side of the opening portions 212A of the bag layer 21A. When the opening portion 212A of the bag layer 21A is outwardly folded at the bag portion 211A thereof, the opening portion 212A of the bag layer 21A is coupled at the picking portion 101A of the picking tool 10A via the first and second detachable fasteners 31A, 32A.

Figure 7:
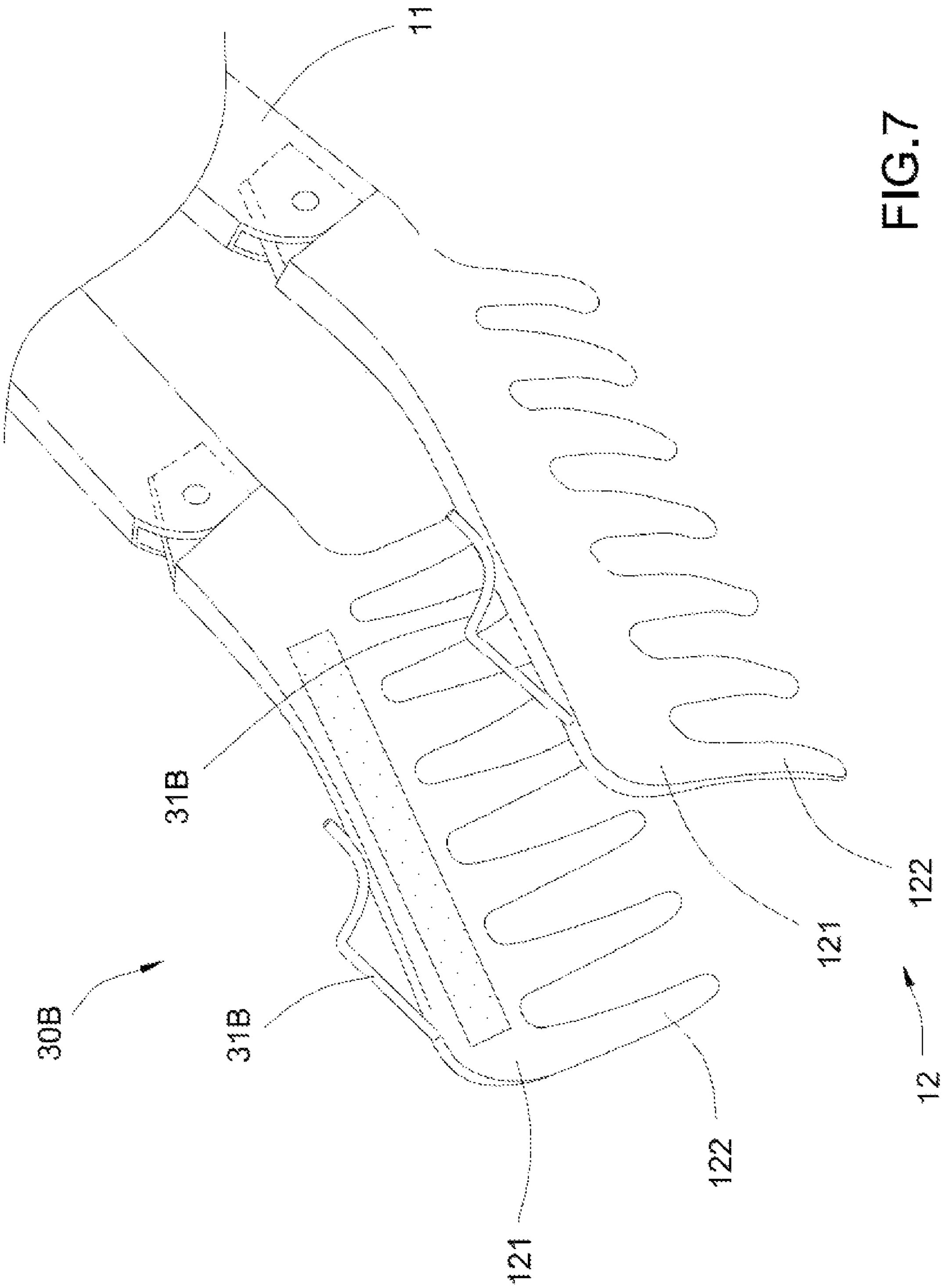
FIG. 7 is a perspective view of a third alternative mode of the picking tool according to the above preferred embodiment of the present invention.

FIG. 7 illustrates another alternative mode of the control arrangement 30B according to the preferred embodiment of the present invention. The control arrangement 30B comprises two elastic hooks 31B provided at the picking portions 101 of the picking tool 10 to detachably couple at the opening 23 of the disposable bag 10. Accordingly, the elastic hook 31B extended from one edge of the extension frame 121 while the claw members 122 are spacedly extended along an opposed edge of the extension frame 121. The elastic hooks 31B are arranged to detachably engage with the bag portions 211 of the bag layers 21 respectively to hold the picking portions 101 of the picking tool 10 at the opening 23 of the disposable bag 20. Particularly, one end of the elastic hook 31B is extended from the edge of the extension frame 121 while another free end of the elastic hook 31B is arranged to detachably engage with the bag layer 21. It should be appreciated that the elastic hooks 31B can be elastic clips to detachably clip on the bag portions 211 of the bag layers 21 respectively so as to hold the picking portions 101 of the picking tool 10 at the opening 23 of the disposable bag 20.

Figure 10:
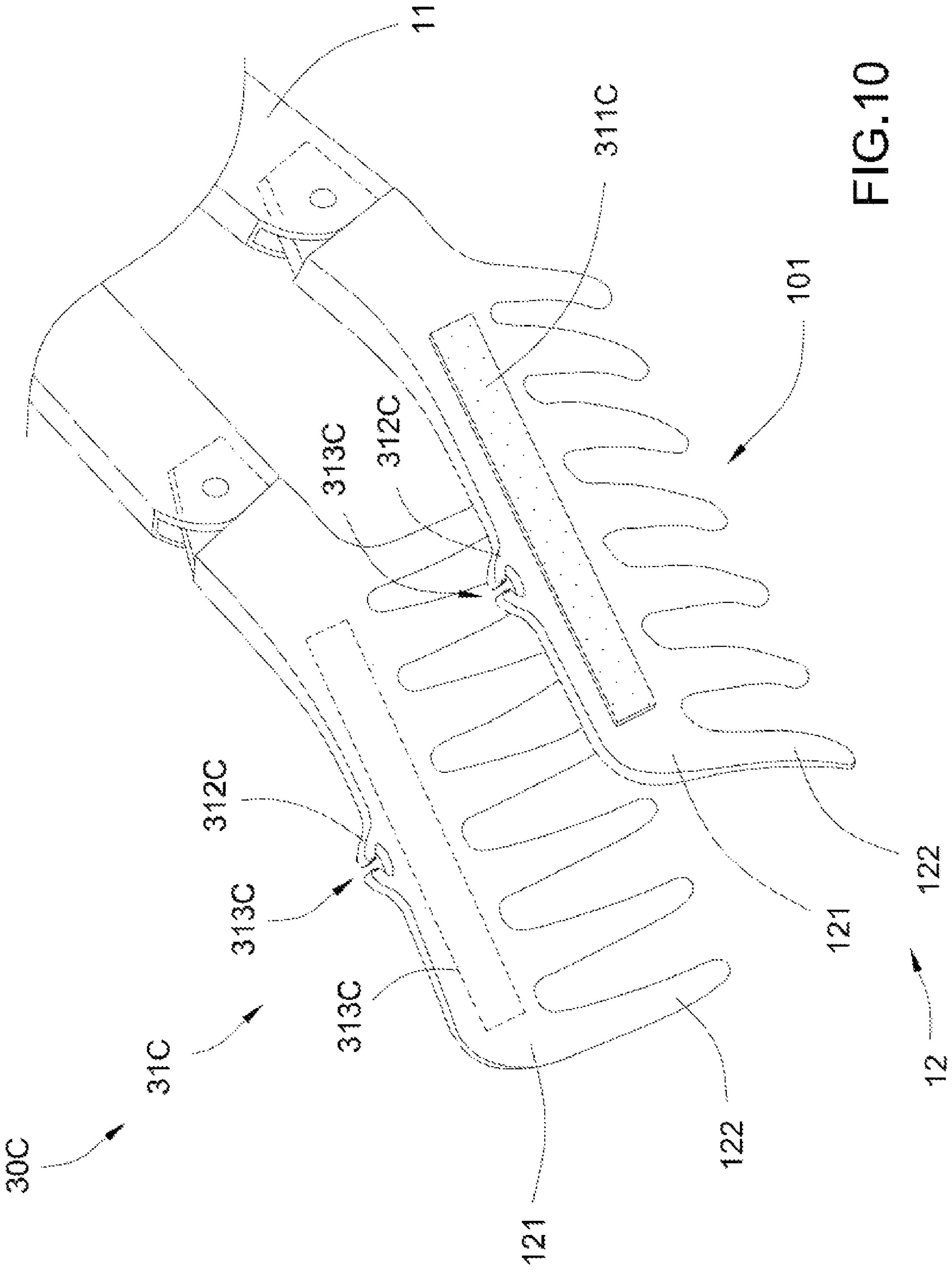
FIG. 10 is a fourth alternative mode of the portable ground picking collector according to the above preferred embodiment of the present invention.

FIG. 10 illustrates another alternative mode of the control arrangement 30C according to the above preferred embodiment of the present invention. The control arrangement 30C comprises two control units 31C provided at the picking portions 101 of the picking tool 10 to detachably couple at the opening 23 of the disposable bag 10 respectively. Accordingly, each of the control units 31C comprises an elongated frictional pad 311C provided at an outer side of the extension frame 121 and a bag clip 312C, having an elastic bag slit 313C, upwardly extended from the extension frame 121. As shown in FIG. 10, the frictional pad 311C is made of high frictional coefficient material, such as rubber, to frictionally engage with the outer side of the bag layer 21. Preferably, the frictional pad 311C is made of reusable adhesive to detachably adhere on the outer side of the bag layer 21. The bag clip 312C is extended from the pad body 311C at a direction away from the picking claws 12. Preferably, the bag clip 312C is integrally extended from the extension frame 121 to form a one-piece pad structure. The elastic bag slit 313C is extended from a top side of the bag clip 312C, wherein the bag layer 21 is slid into and held at the elastic bag slit 313C to retain the bag layer 21 at the picking portion 101 of the picking tool 10. Preferably, the bag portions 211 of the disposable bag 20 are frictionally engaged, preferably adhered, to the frictional pad 311C while the opening portions 212 of the disposable bag 20 are detachably clipped at the elastic bag slits 313C of the bag clips 312C.

Figure 9:
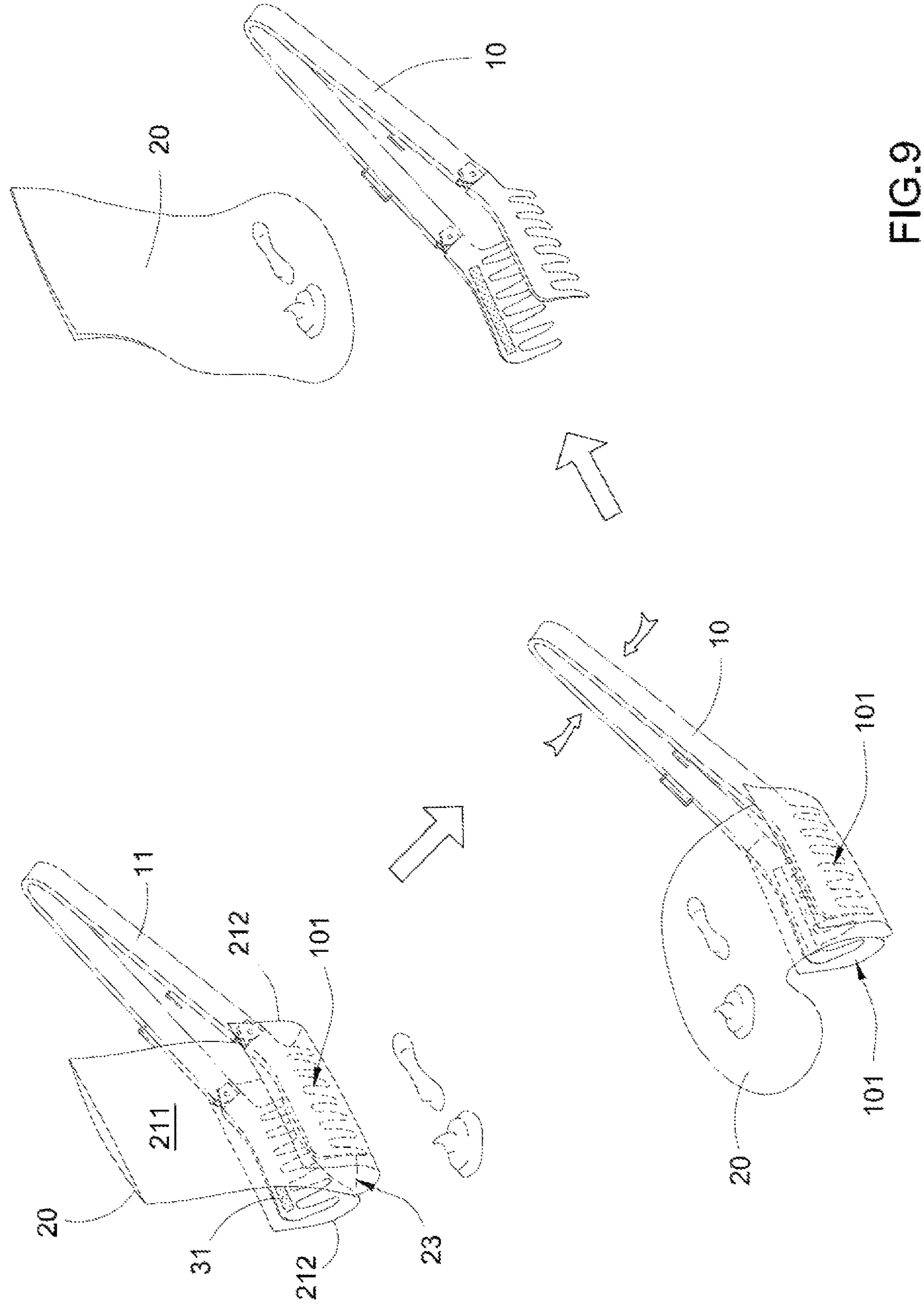
FIG. 9 illustrates an operation of the portable ground picking collector according to the above preferred embodiment of the present invention.

On the other hands, referring to FIG. 9, the operation of the portable ground picking collector according to the above preferred embodiment as shown in FIGS. 1-7 and 10 comprises the following steps.

(1) Configure the two picking portions 101 of the picking tool 10 to respectively couple at the opening portions 212 of the disposable bag 20 at positions that the picking portions 101 of the picking tool 10 are able to be wrapped by the disposable bag 20.

(2) Actuate the picking tool 10 to move the two picking portions 101 thereof away from each other to open up the opening 23 of the disposable bag 20.

(3) Actuate the picking tool 10 to pick up the ground waste by means of the picking portions 101 of the picking tool 10 for guiding the ground waste into the storage cavity 22 of the disposable bag 10.

(4) Configure the picking portions 101 of the picking tool 10 to detach from the disposable bag 20 for disposing the disposable bag 20 with the ground waste contained inside.

Figure 8:
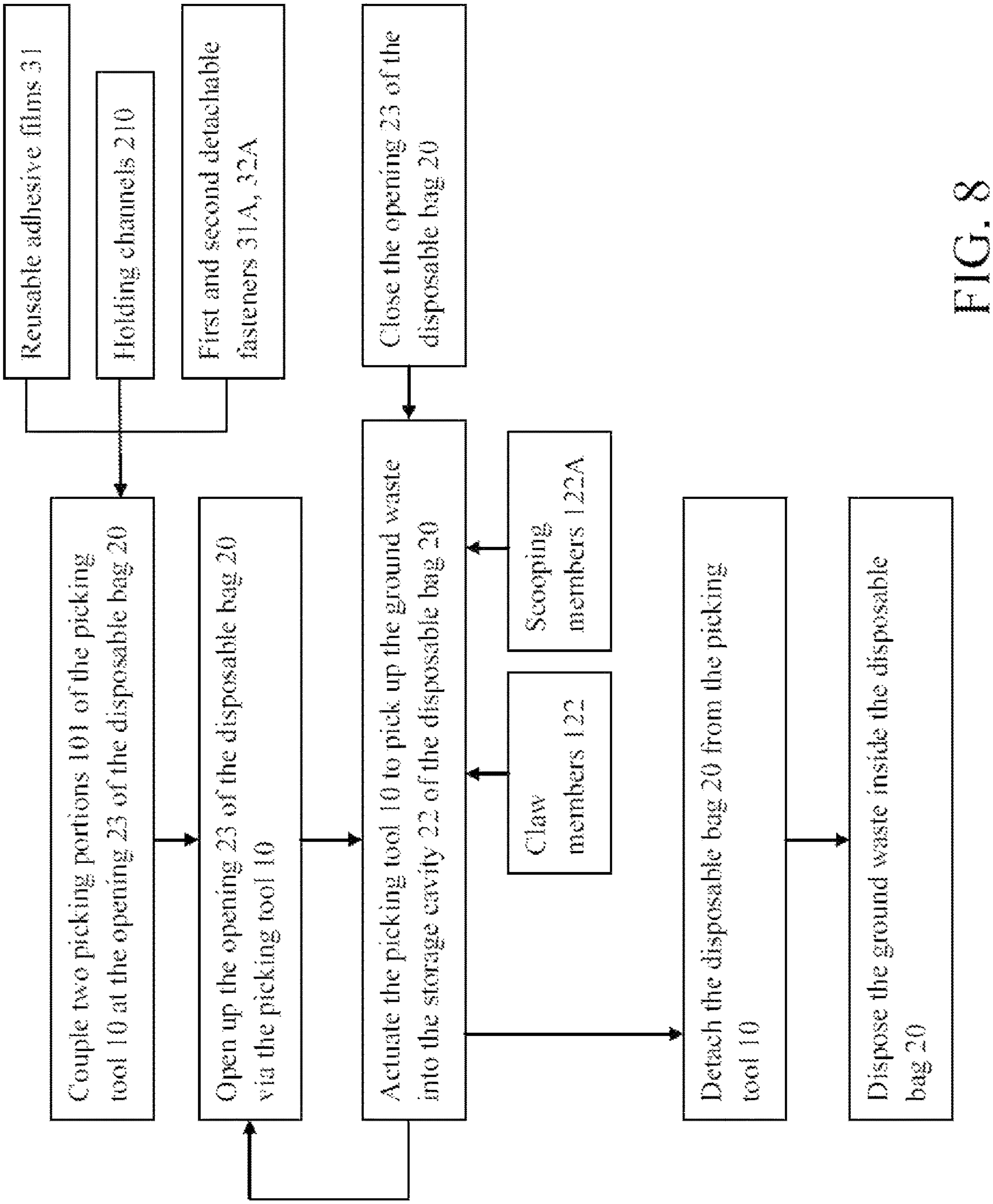
FIG. 8 is a flow chart of a method of picking ground waste by a portable ground picking collector according to the above preferred embodiment of the present invention.

In terms of the user's operation, FIGS. 8 and 9 illustrate a method of picking ground waste by the portable ground picking collector which comprises the following steps.

(1) Couple the two picking portions 101 of the picking tool 10 at the opening 23 of the disposable bag 20 at a position that the picking portions 101 of the picking tool 10 are wrapped by the disposable bag 20.

In the step (1), the two picking portions 101 of the picking tool 10 are coupled at the opening 23 of the disposable bag 20 via the control arrangement 30. In one embodiment, the picking portions 101 of the picking tool 10 are adhered at the opening 23 of the disposable bag 20 via the reusable adhesive films 31. In another example, the picking portions 101 of the picking tool 10 are coupled at the opening 23 of the disposable bag 20 by sliding the picking portions 101 of the picking tool 10 at the holding channels 210 respectively. Alternatively, the picking portions 101 of the picking tool 10 are coupled at the opening 23 of the disposable bag 20 via the first and second detachable fasteners 31A, 32A. Furthermore, the picking portions 101 of the picking tool 10 are coupled at the opening 23 of the disposable bag 20 via the elastic hooks 31B. Then, the opening portion 212 of the bag layer 21 can be folded to overlap on the bag portion 211 to wrap the picking portion 101 of the picking tool 10.

It is worth mentioning that after the picking portions 101 of the picking tool 10 are coupled at the opening 23 of the disposable bag 20, the claw members 122 of the picking claws 12 are extended toward the opening 23 of the disposable bag 20. In another example, the scooping members 122A of the picking scoops 12A are extended toward the opening 23 of the disposable bag 20.

(2) Open up the opening 23 of the disposable bag 20 by actuating the picking tool 10 to move the picking portions 101 thereof away from each other. Once the picking portions 101 of the picking tool 10 are coupled at the opening 23 of the disposable bag 20, the opening 23 of the disposable bag 20 is opened by actuating the hand-held handle 11 to move the picking portions 101 thereof away from each other.

(3) Actuate the picking tool 10 to pick up the ground waste by the picking portions 101 of the picking tool 10 for guiding the ground waste into the storage cavity 22 of the disposable bag 20. In order to pick up the ground waste, the user is able to actuate the picking tool 10 for holding the disposable bag 20 upside down so as to face the opening 23 of the disposable bag 20 toward the ground waste. The user is able to pick up the ground waste by moving the picking portions 101 of the picking tool 10 toward to each other so as to close the opening 23 of the disposable bag 20 at the same time via the claw members 122 or the scooping members 122A. Once the opening 23 of the disposable bag 20 is closed, the ground waste will be disposed in the disposable bag 20. It is worth mentioning that since the ground waste is disposed at the bottom of the disposable bag 20, the user is able to open up the opening 23 of the disposable bag 20 again to pick up another ground waste until the disposable bag 20 is full.

(4) Detach the disposable bag 20 from the picking portions 10 of the picking tool 10 to dispose the ground waste inside the disposable bag 20. Once the picking operation is completed, the user is able to detach the disposable bag 20 from the picking tool 10 simply by pulling the disposable bag 20 from the picking tool 10. It is worth mentioning that through the picking operation, the user's hand and the picking tool 10 will not contact with the ground waste. Therefore, the user's hand and the picking tool 10 will not be contaminated during the picking operation.

Accordingly, all the features in the above preferred embodiment and its alternatives are interchangeable to achieve the objective of the present invention. For example, the tong like picking tool or the scissor like picking tool can be coupled at the opening 23 of the disposable bag 20 via the reusable adhesive films 31, the holding channels 210, the first and second detachable fasteners 31A, 32A and/or the elastic hooks 31B. Likewise, the tong like picking tool or the scissor like picking tool can incorporate with the disposable bag 20 having two opening portions 212 as shown in FIG. 1 or one opening portion 212 as shown in FIG. 5. In other words, the picking tool 10, 10A, the disposable bag 20, 20A, and the control arrangement 30 of the embodiment and its alternatives can be interchangeably used in different applications and can be modified to pick up and collect ground waste in the disposable bag so as to prevent any contamination of the picking tool during the picking operation.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A portable ground picking collector for picking and collecting ground waste with a disposable bag comprising two bag layers and defining a storage cavity therein and having an opening communicating with the storage cavity, comprising:

a picking tool having two picking portions; and a control arrangement provided at the picking tool and arranged for being operated between the picking tool and the disposable bag adjacent to the opening thereof to detachably hold at the two picking portions of the picking tool at the two bag layers respectively, wherein when the picking tool is actuated to move the picking portions thereof away from each other, the opening of the disposable bag is opened up for receiving the ground waste in the storage cavity, wherein when the picking tool is actuated to move the picking portions thereof toward each other for picking up the ground waste, the opening of the disposable bag is closed to retain the ground waste in the storage cavity, such that the disposable bag is able to be detached from the picking tool for disposing the disposable bag with the ground waste contained therein, wherein the control arrangement comprises two first detachable fasteners provided at two inner sides of the picking portions of the picking tool respectively and two second detachable fasteners configured to be provided at two outer sides of the two bag layers of the disposable bag respectively, such that when the first and second detachable fasteners are detachably fastened with each other, the picking portions of the picking tool are held at the two bag layers respectively, and that when the first and second detachable fasteners are detached from each other, the disposable bag is detached from the picking tool.

2. The portable ground picking collector, as recited in claim 1, wherein the first and second detachable fasteners are hook and loop fasteners respectively.

3. A method of picking ground waste by a portable ground picking collector, which comprises a picking tool, with a disposable bag, comprising steps of:

(a) configuring two picking portions of the picking tool to respectively couple at opening portions of the disposable bag at positions that the picking portions of the picking tool are able to be wrapped by the disposable bag, wherein the disposable bag comprises two bag layers overlapped with each other to define a storage cavity between the two bag layers;

(b) actuating the picking tool to move the two picking portions thereof away from each other to open up the opening of the disposable bag (c) actuating the picking tool to pick up the ground waste by the picking portions of the picking tool for guiding the ground waste into the storage cavity of the disposable bag; and (d) configuring the picking portions of the picking tool to detach from the disposable bag for disposing the disposable bag with the ground waste contained in the storage cavity thereof;

wherein the step (a) further comprises steps of:

(a.1) providing two first detachable fasteners at two inner sides of the picking portions of the picking tool respectively;

(a.2) providing two second detachable fasteners at two outer sides of the bag layers of the disposable bag respectively; and (a.3) detachably fastening the first and second detachable fasteners with each other to retain the picking portions of the picking tool at the bag layers respectively wherein when the first and second detachable fasteners are detached from each other, the disposable bag is detached from the picking tool.

4. The method, as recited in claim 3, wherein the first and second detachable fasteners are hook and loop fasteners respectively.

* * * * *